United States Patent
Shamsuddin et al.

(10) Patent No.: US 11,985,953 B2
(45) Date of Patent: May 21, 2024

(54) POULTRY HEALTH BENCHMARKING SYSTEM AND METHOD

(71) Applicant: Flox Limited, London (GB)

(72) Inventors: Imtiaz Shamsuddin, London (GB); Nils Hügelmann, London (GB); Luke Robinson, London (GB)

(73) Assignee: Flox Limited, London (GB)

( * ) Notice: Subject to any disclaimer, the term of this patent is extended or adjusted under 35 U.S.C. 154(b) by 97 days.

(21) Appl. No.: 17/865,664

(22) Filed: Jul. 15, 2022

(65) Prior Publication Data
US 2023/0019190 A1    Jan. 19, 2023

Related U.S. Application Data

(60) Provisional application No. 63/222,596, filed on Jul. 16, 2021.

(51) Int. Cl.
*A01K 11/00* (2006.01)
*G06T 7/20* (2017.01)

(52) U.S. Cl.
CPC .............. *A01K 11/008* (2013.01); *G06T 7/20* (2013.01)

(58) Field of Classification Search
CPC .... A01K 11/008; A01K 29/005; A01K 11/00; G06T 7/20
See application file for complete search history.

(56) References Cited

U.S. PATENT DOCUMENTS

| | | | | |
|---|---|---|---|---|
| 2020/0188164 A1* | 6/2020 | Myslinski | ............ | A61B 5/4368 |
| 2020/0321116 A1* | 10/2020 | Neumann | ............... | G16H 50/00 |
| 2021/0153479 A1* | 5/2021 | Mindel | .................. | G06N 20/00 |

FOREIGN PATENT DOCUMENTS

| | | |
|---|---|---|
| CN | 111160271 A | 5/2020 |
| WO | 2021242824 A1 | 12/2021 |

OTHER PUBLICATIONS

Jukan Admela et al: "Fog-to-Cloud Computing for Farming: Low-Cost Technologies, Data Exchange, and Animal Welfare", IEEE Computer Society, IEEE, USA, vol. 52, No. 10, Oct. 1, 2019 (Oct. 1, 2019), pp. 41-51.
Search Report for International Patent Application PCT/IB2022/056552, mailed on Nov. 25, 2022.
Written Opinion of the Search Authority for International Patent Application PCT/IB2022/056552, mailed on Nov. 25, 2022.
International Preliminary Report on Patentability for International Patent Application PCT/IB2022/056552, mailed on Oct. 18, 2023, 9 pages.

* cited by examiner

*Primary Examiner* — Omeed Alizada
(74) *Attorney, Agent, or Firm* — Fresh IP PLC; John R. Bednarz (57) ABSTRACT

A method includes training, by at least one processor, an artificial intelligence model using a library of data associated with poultry, receiving, by the at least one processor, realtime information associated with a plurality of poultry from at least one imaging device at a particular location, determining, by the at least one processor, at least one benchmark based on the realtime information associated with the plurality of poultry from the at least one imaging device and using the artificial intelligence model, and generating and sending, by the at least one processor, an alert in realtime to a client computing device based on the realtime information associated with the plurality of poultry.

22 Claims, 5 Drawing Sheets

POULTRY HEALTH BENCHMARKING SYSTEM AND METHOD

CROSS-REFERENCE TO RELATED APPLICATION

This application claims the benefit of U.S. Provisional Application No. 63/222,596 filed Jul. 16, 2021, entitled "Poultry Health Benchmarking System and Method," the entire contents of which are incorporated herein by reference.

BACKGROUND

It is very difficult and challenging to determine the welfare of poultry and livestock. Current methods are manual (e.g., walking chicken sheds, physically measuring a temperature of a pen). Unrepresentative data points and poor analytics result because of the manual interpretation of the data and/or because the data is inaccurate (e.g., weights of chickens obtained using scales that are inaccurate for older birds). If a farm does not monitor the welfare of its poultry or livestock, this can greatly reduce the yield. This could reduce the efficiency of the farm's limited resources and the short-term and long-term sustainability of the farm. Additionally, failing to determine the welfare of poultry and livestock has eroded the trust of consumers in the supply chain. Improving welfare across a number of farms may provide environmental benefits, improve the welfare of poultry and livestock, and create trust through the supply chain to the consumer.

It is with these issues in mind, among others, that various aspects of the disclosure were conceived.

SUMMARY

According to one aspect, a poultry health benchmarking system and method is provided for determining poultry health benchmarking information. At least one imaging device may obtain realtime information associated with a plurality of poultry located in at least one location. The system may have an artificial intelligence or machine learning model based on a library of poultry data that may include the realtime information associated with the plurality of poultry located in the at least one location. At least one shed computing device and/or at least one server computing device may send alert information associated with benchmark information to at least one client computing device. The benchmark information may be based on the realtime information associated with the plurality of poultry located in the at least one location.

In one example, a method may include training, by at least one processor, an artificial intelligence model using a library of data associated with poultry, receiving, by the at least one processor, realtime information associated with a plurality of poultry from at least one imaging device at a particular location, determining, by the at least one processor, at least one benchmark based on the realtime information associated with the plurality of poultry from the at least one imaging device and using the artificial intelligence model, and generating and sending, by the at least one processor, an alert in realtime to a client computing device based on the realtime information associated with the plurality of poultry.

In another example, a system may include at least one processor of a computing device to train an artificial intelligence model using a library of data associated with poultry, receive realtime information associated with a plurality of poultry from at least one imaging device at a particular location, determine at least one benchmark based on the realtime information associated with the plurality of poultry from the at least one imaging device and using the artificial intelligence model and generate and send an alert in realtime to a client computing device based on the realtime information associated with the plurality of poultry.

In another example, a non-transitory computer-readable storage medium may have instructions stored thereon that, when executed by at least one computing device cause the at least one computing device to perform operations, the operations including training an artificial intelligence model using a library of data associated with poultry, receiving realtime information associated with a plurality of poultry from at least one imaging device at a particular location, determining at least one benchmark based on the realtime information associated with the plurality of poultry from the at least one imaging device and using the artificial intelligence model, and generating and sending an alert in realtime to a client computing device based on the realtime information associated with the plurality of poultry.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Aspects of a system and method for determining poultry health benchmarking includes at least one server computing device, at least one shed computing device, at least one imaging device, and at least one client computing device that have a poultry health benchmarking application. The at least one imaging device may obtain realtime information including imaging information and sensor information associated with a plurality of poultry located in at least one location. The system have an artificial intelligence or machine learning model based on a library of poultry data that may include the realtime information associated with the plurality of poultry located in the at least one location. The at least one shed computing device and/or the at least one server computing device may send alert information associated with benchmark information to the at least one client computing device. The benchmark information may be based on the realtime information associated with the plurality of poultry located in the at least one location. The poultry may include chickens, turkeys, ducks, geese, and other types of poultry. In addition, the system may be used to determine livestock health benchmarking and may be used to determine information associated with livestock and/or poultry. The livestock may include cattle, sheep, pigs, goats, and other types of livestock.

Improving efficiency starts with systematically measuring efficiency by the system. In one example, for each imaging device or sensor, the system may determine that a certain section or subset of a shed is indicating particular information about poultry in the subset of the shed and can predict what may happen in the shed as a whole. In particular, the system can obtain information from one or more imaging devices in a section of the shed and use the information to predict what may happen in the shed as a whole. In addition, the system can utilize information from multiple sheds to aggregate the data to determine what may happen in an individual shed by training a model that may be applicable to one or more sheds.

The system may utilize analytics information, prediction information, and recommendation information and provide the information to a poultry processing plant and management dashboards to automatically improve poultry processing plant processes and/or better address supply chain changes. The system may be used to forecast and provide predictions for the poultry processing plant and also may provide recommendations such as interventions or physical walks to particular sheds.

The system may process and compress raw data, e.g., image, sound, rate information, into general statistics that may be relevant to a poultry farm. The general statistics may be understandable, identify potential problems, and may be easily transmitted using low bandwidth. In addition, the system may apply data processing techniques to anonymize data and may utilize synthetic data as well as provide data obfuscation that may provide enhancements to privacy. As a result, trade secrets associated with a particular farm may be removed before the data is sent to a server or aggregated with data from other farms by the server. Even further, the anonymized data from multiple farms may be aggregated from multiple farms and producers such that it can be used to provide more meaningful benchmarks that may allow businesses to set bonuses, benchmark progress, and grade outputs. The benchmarks even may be used to create meaningful user and industry dashboards. Users may be able to control what is shared to a pool of aggregated data sent to the server. Processed data feeds and benchmark information may be linked from a producer to a supply, e.g., feed, veterinarians, auditors, and retailers to allow for automatic triggering of reordering, farm visits, inspections, price changes, and automatic adjustments to contracts associated with the poultry. As another example, the system may provide one or more recommendations associated with third-party products and may process payments associated with the plurality of poultry. In one example, the payments may be processed using another third-party payment processor, server, or storefront.

In some examples, the plurality of poultry may be located in one or more sheds or locations. As an example, the locations may include indoor locations and/or outdoor locations. The poultry may include free range birds that may be located in indoor locations and/or outdoor locations on a particular farm.

As an example, the system may be used to determine and obtain benchmark analytics from multiple poultry enclosures. The multiple poultry enclosures may be located at one location or more than one location such as one farm or multiple farms. In addition, the system may determine average benchmark information for poultry at a location or farm and may be used to determine overall health information for the poultry at the location or farm. The overall health information may be based on a realtime comparison between a plurality of farms. As an example, a first farm may have poultry that have a health score or welfare index that is over a particular threshold, such as an average threshold or a particular minimum threshold. The first farm may have a higher health score or welfare index than a second farm. This information may be used to determine which locations or farms are scoring better than other locations or farms. In addition, the information may be used by a user or farmer at a particular location or farm to allow the user or farmer to measure or compare the particular location or farm with another farm or a plurality of farms. In other words, the information may be used by the farmer to allow the farms to measure the farm against benchmarking metrics which are industry metrics, e.g., average poultry metrics. In addition, the user or farmer may view the information using a client computing device and view the information on a graphical user interface (GUI). For example, the user may view a histogram of poultry or bird mortality and counts of poultry or bird mortality in different periods of time. Additionally, the information may be used to track improvements, A/B testing, or control testing. Even further, the information may be used to provide systematic testing to improve benchmarks in quick iterations such as feed additions.

The system may be used to improve feed conversion ratio (FCR) to save feed cost and maximum live weight. This may improve the health of the poultry and systematically improve the health of each individual animal. This may enable data-driven operational efficiencies and planning/forecasting for all supply-chain stakeholders. At the same time, consumers may be empowered with informed consumption of high-quality products and have access to provenance and welfare data. The system also may set and provide financial incentives for farmers to increase welfare at one or more farms.

In one example, the system may utilize artificial intelligence as well as sensor information obtained from the at least one imaging device to perform artificial intelligence processing of data obtained by the system. The system may utilize a plurality of different artificial intelligence models. The at least one imaging device may provide farmers full-shed videos of their poultry twenty-four hours a day, seven days a week, day and night, and in realtime.

As an example, the system may perform artificial intelligence processing of data including at least the following: processing of full shed images (stitched), full mortality detection and analysis, remote farmer access, cluster analysis and alert, footfall analysis (full shed), thermometric sensor analysis, thermal imaging for health, produce sounds for welfare, activity index, ammonia sensing, illness or maim detection by behavior, full individual chicken tracking for research (full shed), directed rover for activity and inspection, pan-tilt-zoom (PTZ) close up view, free-range visual inspection, weighing by sound, directed light to cause activity, visual weighing, drinker/feeder height corrections, podo/hock sickness detection with close view, human in shed detection, litter quality monitoring, shed clean-out detection, chicken count estimate, sound monitoring full shed, robot for inspection and activity, visual inspection at nighttime (including catching), e-nose/smells, recommendation engine, welfare index, anomaly detection, gait scoring, audit support, silo management, activity share analysis, warped view deep dive, pan-tilt-zoom (PTZ) for manual control, activity index, extra IR illumination, mobile access, PTZ close inspection by anomaly detection, macro movement analysis, pose estimation, beacon sensors, farm management tools, deviation from normal indexes as sickness indicator, toys analysis for research, colorization of night vision, outside weather monitoring and alerts, check focused analysis, collecting sound for welfare, flu detection, rover for collection of eggs/dead birds, dominant chicken and cockerels detection, feeding analysis segmentation, feather coverage and feather cleanliness, consumer provenance MotherHen, close view for utilization, research antibiotics, sleep disturbance, light intensity for research or health, management scoring system, outdoor counting, light maps, measuring damaging behaviors, and feeder/drinker popularity analysis, among others.

The system may perform processing at the particular location by the at least one shed computing device and/or may perform processing by the at least one server computing device that may be located at a different location. The at least one shed computing device may be on-premises and execute one or more algorithms on the data from the at least one imaging device including images and/or sensor data that may be used to improve benchmarks. Information based on the images and/or sensor data may be provided to one or more users such as farmers to take actions to improve clustering, mortality, ammonia levels, and others. However, the system may anonymize the data at the at least one shed computing device before sending the data to the at least one server computing device. As another example, the data could be stored on one or more detachable computer-readable media that may be physically transferred by courier. In addition, the system may send the realtime information as anonymized data and/or may create de-identification data to be combined with the realtime anonymized data that may be sent to the at least one server computing device. In addition, the at least one shed computing device may encrypt the realtime data that is sent to the at least one server computing device. The at least one shed computing device and/or the at least one server computing device may deliver alerts and insights to farms and provide decision-support data to industry stakeholders.

In one example, higher-bandwidth computing tasks and models may be executed by the at least one shed computing device and the at least one server computing device may utilize models that may use pre-aggregated or lower bandwidth data. Additionally, the at least one shed computing device may provide outputs of on-premise models, e.g., aggregate and low-bandwidth data. This may provide a number of benefits including transporting of data in a more efficient manner and providing processing efficiency improvements.

The at least one shed computing device and/or the at least one server computing device may store the realtime anonymized information and/or the de-identification data in the library as well as in a database. Even further, the system may store the information on a distributed ledger or may use one or more blockchains to store information associated with the plurality of poultry. This may provide an auditing system or audit trail that may allow a user to audit or inspect the data to ensure that data was actually collected. This may further allow the system to verify the origin, time, authenticity, completeness, and validity of the data because it may be digitally signed. In addition, there may be multiple levels of audits including a farm level, an aggregate level, a consumer level, and other levels. As an example, there may be a shop/retailer level that may allow the shop or retailer to view welfare data about the poultry available in their one or more shops or one or more retail locations. This may allow an origin or provenance of the data to be shared up and down the supply chain to government regulators and consumers.

As an example, the system may perform a method including training, by at least one processor, an artificial intelligence model using a library of data associated with poultry, receiving, by the at least one processor, realtime information associated with a plurality of poultry from at least one imaging device at a particular location, determining, by the at least one processor, at least one benchmark based on the realtime information associated with the plurality of poultry from the at least one imaging device and using the artificial intelligence model, and generating and sending, by the at least one processor, an alert in realtime to a client computing device based on the realtime information associated with the plurality of poultry.

The library of data may be based on one or more models that are pre-trained using data from other (e.g., previous) farms and then the one or more models may be trained continuously using locally obtained data as well as data from other farms. In other words, initial data may be from other farms to begin but over time the data may be obtained from a particular farm. A specific model may be associated with the particular farm and the specific model will be based on a larger percentage of data from the particular farm that continues to increase over time as more data is collected from the particular farm to train the specific model. The shed computing device may collect ground truth data for model training using automated/manual sources like gait scoring or other welfare metrics calculated by humans, automated scales, shed walk logs including mortality logs, and veterinarian logs, among other information. The data may be used to refine the models. Thus, each time the data is aggregated the model may be generalized and may be utilized with a plurality of sheds and farms.

Figure 1:
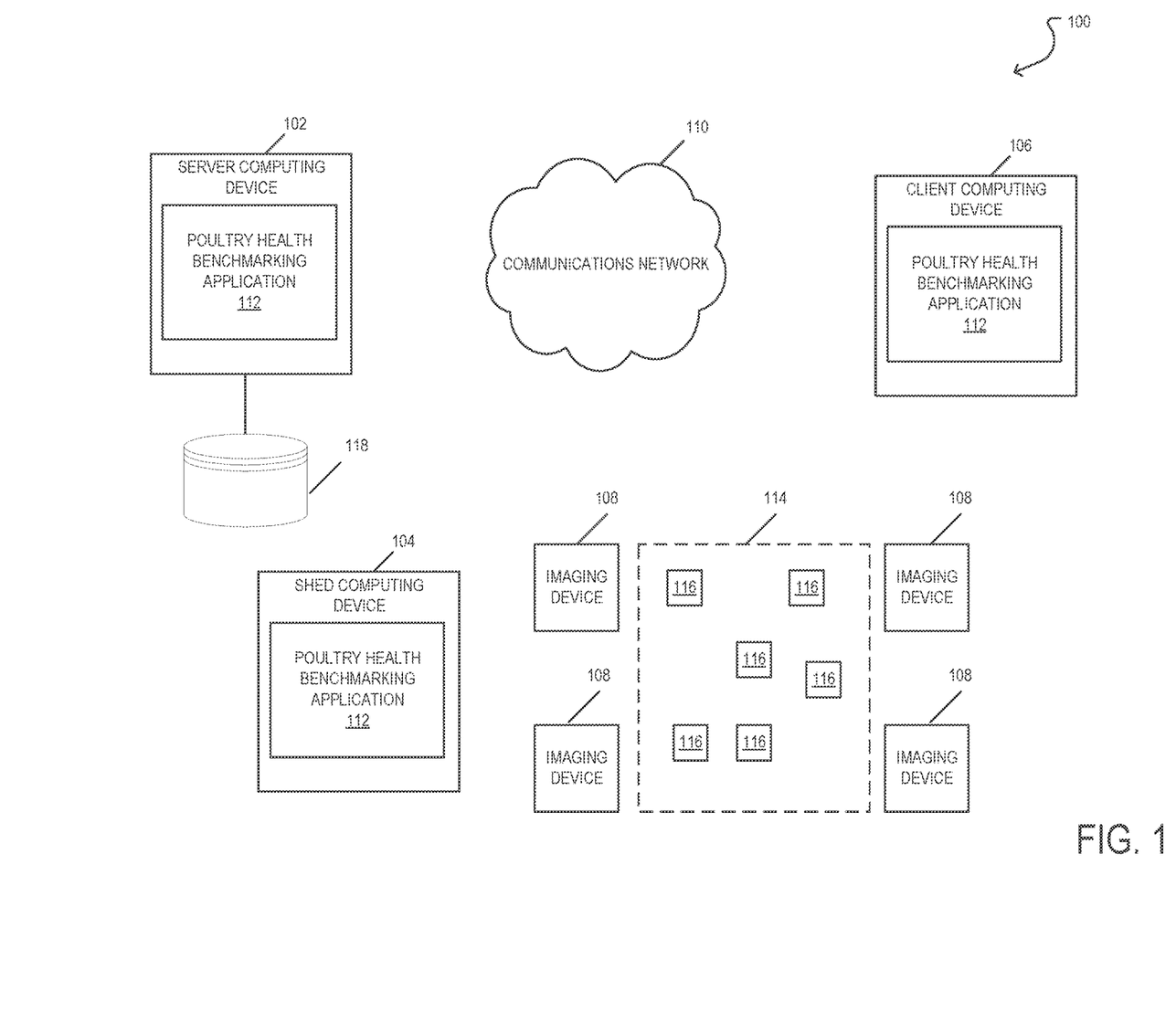
FIG. 1 is a block diagram of a poultry health benchmarking system according to an example of the instant disclosure.

FIG. 1 illustrates a block diagram of a poultry health benchmarking system 100 according to an example embodiment. The poultry health benchmarking system 100 may include a plurality of computing devices including at least one server computing device 102, at least one shed computing device 104, at least one client computing device 106, and at least one imaging device 108 that communicate via a communication network 110. The at least one server computing device 102 and/or the at least one shed computing device 104 may be one or more computing devices, a virtual machine, a container, or another computing virtualization that may be capable of executing one or more programs or applications. The at least one server computing device 102, the at least one shed computing device 104, and the at least one client computing device 106 may execute and deploy a poultry health benchmarking application 112.

As shown in FIG. 1, the at least one imaging device 108 may be used to obtain realtime poultry health benchmarking information for a plurality of poultry 116 that may be physically located at a particular location 114. The particular location 114 may be an enclosure, shed, pen, fenced area, or another location that houses the plurality of poultry 116. The plurality of poultry may include one or more chickens, one or more turkeys, one or more ducks, and/or one or more geese. A particular farm may have a plurality of particular locations 114, e.g., a plurality of enclosures, sheds, pens, or fenced areas that may be monitored by the at least one imaging device 108. Alternatively, the particular location 114 may be an enclosure, shed, pen, fenced area, or another location that may house livestock such as cattle, sheep, pigs, lamps, horses, goats, and/or other animals.

The at least one server computing device 102 is configured to receive data from and/or transmit data to the at least one shed computing device 104, the at least one client computing device 106, and the at least one imaging device 108 through the communication network 110. Although the at least one server computing device 102 is shown as a single computing device, it is contemplated that the at least one server computing device 102 may include multiple computing devices. In addition, although the at least one shed computing device 104 is shown as a single computing device, it is contemplated that the at least one shed computing device 104 may include multiple computing devices. In addition, although the at least one client computing device 106 is shown as a single computing device, it is contemplated that the at least one client computing device 106 may include multiple computing devices.

The communication network 110 can be the Internet, an intranet, or another wired or wireless communication network. For example, the communication network 110 may include a Mobile Communications (GSM) network, a code division multiple access (CDMA) network. 3rd Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The at least one server computing device 102 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the poultry health benchmarking application 112. In addition, the at least one server computing device 102 further includes at least one communications interface to transmit and receive communications, messages, and/or signals.

The at least one shed computing device 104 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the poultry health benchmarking application 112. In addition, the at least one shed computing device 104 further includes at least one communications interface to transmit and receive communications, messages, and/or signals.

The at least one client computing device 106 can be a laptop computer, a smartphone, a personal digital assistant, a tablet computer, a standard personal computer, or another processing device. The at least one client computing device 106 may include a display, such as a computer monitor, for displaying data and/or graphical user interfaces. The at least one client computing device 106 may also include a Global Positioning System (GPS) hardware device or other location systems (e.g., other satellite systems or WiFi triangulation) for determining a particular location of the client computing device 106, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The at least one client computing device 106 may display on the display a graphical user interface (or GUI). The graphical user interface may be provided by the poultry health benchmarking application 112. The graphical user interface enables a user of the at least one client computing device 106 to interact with the poultry health benchmarking application 112. As an example, each user of the client computing device 106 may view different data associated with one or more particular locations such as one or more farms or one or more subsets or enclosures (e.g., sheds) of one or more farms. Each user may view a specific dataset and sensitive information may not be displayed.

The poultry health benchmarking application 112 may be a component of an application and/or service executable by the at least one server computing device 102, the at least one shed computing device 104, the at least one client computing device 106, and the at least one imaging device 108. For example, the poultry health benchmarking application 112 may be a single unit of deployable executable code or a plurality of units of deployable executable code. According to one aspect, the poultry health benchmarking application 112 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

The at least one imaging device 108 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the poultry health benchmarking application 112. In addition, the at least one imaging device 108 further includes at least one communications interface to transmit and receive communications, messages, and/or signals. The at least one imaging device 108 may have one or more cameras or imaging devices such as a hyperspectral/multi-spectral camera, a low-resolution camera, a high-definition camera, an infrared camera, one or more sensors such as a temperature sensor, a chemical sensor, an air pressure sensor, an audio sensor, an ammonia sensor, a humidity sensor, a light sensor, a $CO_2$ sensor, an eNose or electronic nose sensor, a disease detector, a wind speed detector, a dust monitor, a vibration sensor such as an accelerometer, a LIDAR sensor, a millimeter wave sensor, and an X-ray device, one or more speakers, one or more microphones, one or more cameras or imaging devices, and/or one or more display devices for displaying output and/or a graphical user interface (GUI). The display device may be a touch screen device. The display device also may be or include one or more lights or light-emitting diodes (LEDs). The at least one imaging device 108 may encrypt data obtained by the at least one imaging device before transmitting the data to another computing device associated with the system 100 and/or outside of the system. The data collected by the at least one imaging device 108 may be processed at the particular location 114 by the at least one imaging device 108 and/or the shed computing device 104. The server computing device 102 may be located on-premises at a farm and/or off-premises. The data may be transmitted off-premises to the server computing device 102 and processed at the server computing device 102. In further examples, it may be processed at both the particular location 114 by the at least one imaging device 108 and/or the shed computing device 104 and the server computing device 102.

The poultry health benchmarking system 100 may also include a relational database management system (RDBMS), a timeseries database system, a blob storage system, or another type of database management system such as a NoSQL database system that stores and communicates data from at least one database 118. As an example, the at least one database 118 may store information associated with the plurality of poultry 116 at the particular location 114. The at least one database 118 may also store information from multiple different pluralities of poultry located at a plurality of locations.

Figure 2:
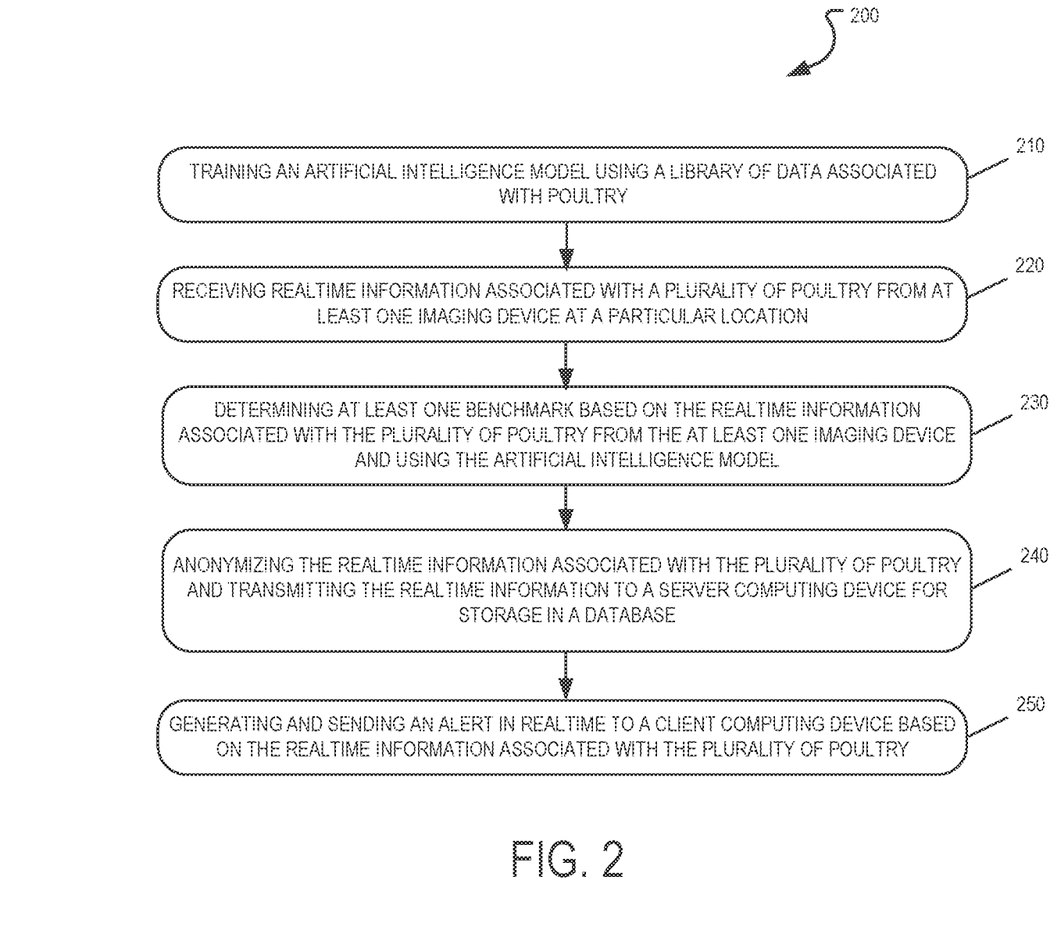
FIG. 2 is a flowchart of a method for receiving realtime information associated with a plurality of poultry from at least one imaging device by the poultry health benchmarking system according to an example of the instant disclosure.

FIG. 2 illustrates an example method 200 for executing one or more functions provided by the poultry health benchmarking application 112. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

Figure 4:
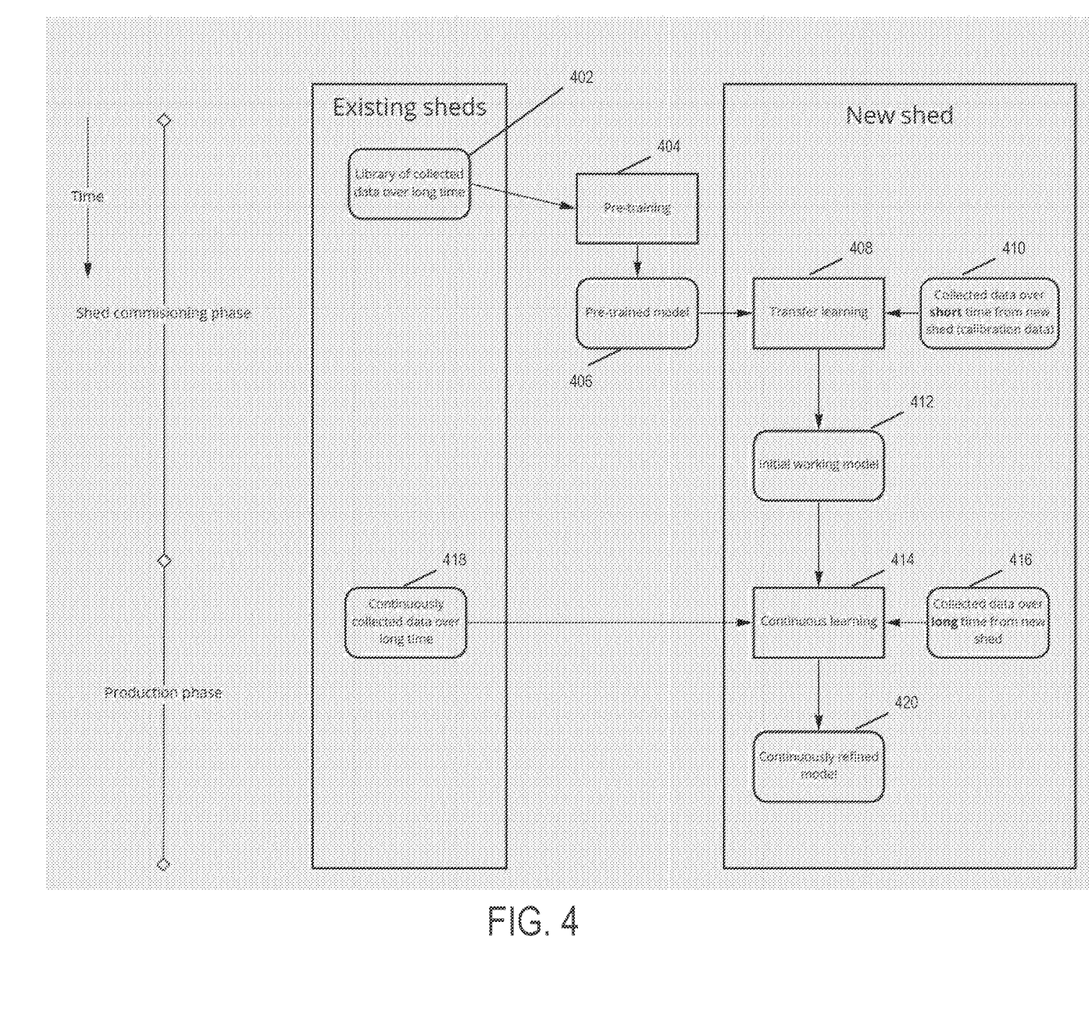
FIG. 4 shows a diagram associated with generating and training an artificial intelligence model for use by the poultry health benchmarking system according to an example of the instant disclosure.

According to some examples, the method 200 includes training, by the at least one shed computing device 102 and/or the at least one imaging device 108 an artificial intelligence model using a library of data associated with poultry at block 210. An example of training the artificial intelligence model and generating the library of data is shown in FIG. 4.

According to some examples, the method 200 includes receiving, by the at least one shed computing device 104, realtime information associated with a plurality of poultry from at least one imaging device 108 at a particular location at block 220. The plurality of poultry may be least one of a chicken, a turkey, a duck, and a goose, among others. As an example, the plurality of poultry may be physically located in a first enclosure at the particular location. As another example, the plurality of poultry may be physically located in at least one enclosure at the particular location. In another example, the plurality of poultry may be located in a plurality of different enclosures at one or more locations.

The plurality of poultry associated with at least one supplier or company. As an example, the plurality of poultry may be supplied by different suppliers or companies. Each supplier or company may have a particular industry ranking, rating, or benchmark. In one example, the ranking, rating, or benchmark may be used to determine information about the plurality of poultry associated with each supplier or company. In particular, an animal welfare organization or charity may be interested in the ranking, rating, or benchmark. Additionally, consumers may be very interested in the ranking, rating, or benchmark. The ranking, rating, or benchmark may be made up of statistics associated with data collected across multiple companies, e.g., many sheds. The rankings, ratings, or benchmarks may be dependent upon needs or desires of industry participants. Participants may subscribe to receive information about the benchmarks or receive alerts or warnings associated with the benchmarks.

According to some examples, the method 200 includes determining, by the at least one shed computing device 104, at least one benchmark based on the realtime information associated with the plurality of poultry from the at least one imaging device and using the artificial intelligence model at block 230. As an example, the at least one benchmark may be one or more of activity monitoring, spread index (e.g., how evenly birds may be using a shed), weight information associated with the plurality of poultry, human activity at the particular location, mortality information associated with the plurality of poultry, and ammonia information at the particular location.

According to some examples, the method 200 includes anonymizing, by the at least one shed computing device 104, the realtime information associated with the plurality of poultry and transmitting the realtime information to the server computing device 102 for storage in the database 118 at block 240.

According to some examples, the method 200 includes generating and sending an alert in realtime to the client computing device 106 based on the realtime information associated with the plurality of poultry at block 250. The alert may be generated and sent by the server computing device 102 and/or the shed computing device 104. The alert also may be sent to other computing devices and may be a push notification, an email, a phone call, or another type of alert.

According to some examples, the method 200 includes transmitting the realtime information associated with the plurality of poultry from the at least one imaging device 108 to the at least one server computing device 102 for processing and then sending the processed realtime data from the at least one server computing device 102 to the client computing device 106 for display on a display of the client computing device 106.

According to some examples, the method 200 includes generating de-identification data based on the realtime information associated with the plurality of poultry from the at least one imaging device 108.

According to some examples, the method 200 includes generating a poultry welfare index based on the at least one benchmark using the artificial intelligence model.

According to some examples, the method 200 includes adding the realtime information to the library of data and retraining the intelligence model using the realtime information.

According to some examples, the method 200 includes generating compressed imaging data by dynamically compressing the realtime information from the at least one imaging device 108 and transmitting the compressed imaging data to the client computing device 106.

According to some examples, the method 200 includes storing information associated with the plurality of poultry using at least one blockchain.

According to some examples, the method 200 includes obtaining the library of data associated with the poultry, the library of data associated with a particular period of time, labeling the library of data associated with the particular period of time, and training the artificial intelligence model. As an example, the method 200 may include one of retraining the artificial intelligence model each day. As another example, the method 200 may include retraining the artificial intelligence model every minute. In some examples, the artificial intelligence model may automatically retrain continuously.

According to some examples, the method 200 may include determining a benchmark associated with the plurality of poultry associated with the at least one supplier or company. According to some examples, the method 200 may include transmitting an alert associated with a particular supplier or company when the benchmark is less than a particular threshold or above a particular threshold.

Figure 3:
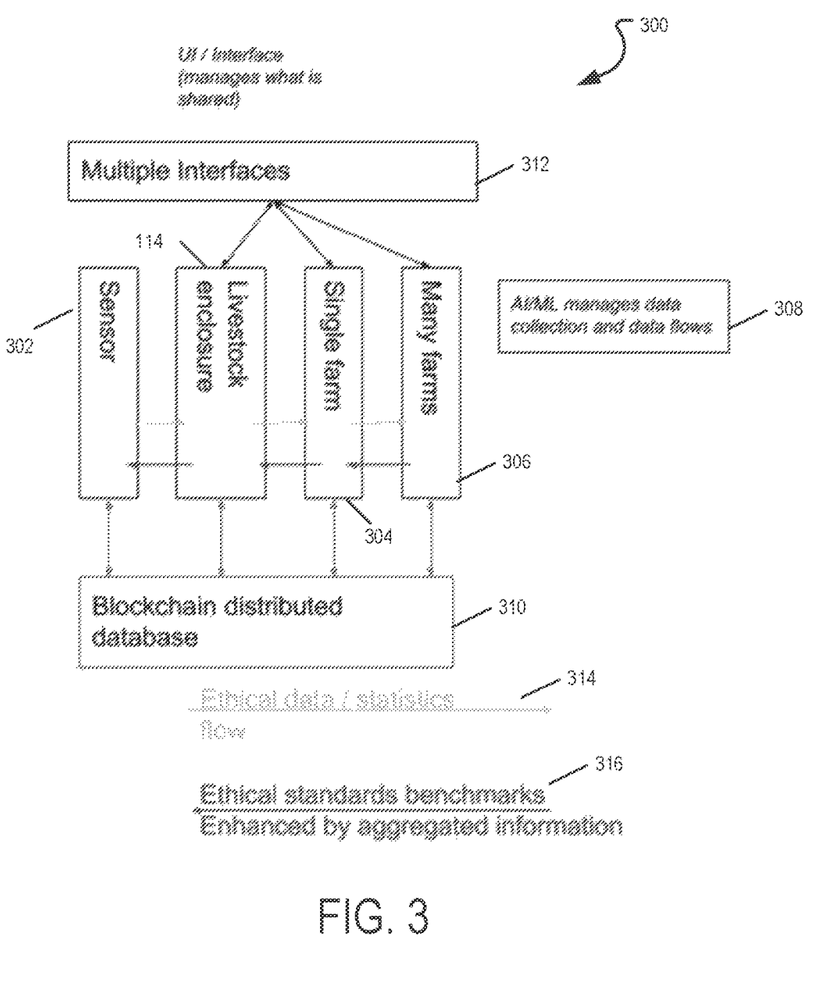
FIG. 3 is a diagram of the data flow and communication of the poultry health benchmarking system according to an example of the instant disclosure.

FIG. 3 shows a diagram 300 of data flow and communication of the system 100 according to an example of the instant disclosure. As shown in FIG. 3, one or more sensors 302 associated with the one or more imaging devices 108 may obtain data and images at one or more poultry enclosures or sheds 114. The data associated with the one or more poultry enclosures 114 may be incorporated or combined with the data and images from a single farm 304 or from many other farms 306. The data and images may be managed using artificial intelligence and machine learning 308. This data and images may be stored in a blockchain distributed database 310 and may be provided to one or more users via one or more interfaces 312. In addition, the data and images may be provided as ethical data or statistics data 314. The ethical data/statistics may be based on ethical standards benchmarks and may be enhanced by aggregated information 316.

FIG. 4 shows a diagram associated with generating and training an artificial intelligence model for use by the poultry health benchmarking system 100 according to an example of the instant disclosure. FIG. 4 shows the process of commissioning the system 100 in a new shed, by using data and models created in existing previous sheds. The previous ("pre-trained") model can be used quickly in a new shed after just one training iteration that uses a small amount of data from the new shed. Then, over time, it is refined continuously with new data as it is collected.

As shown in FIG. 4, the artificial intelligence model may be based on a library of collected data 402 that may be from a plurality of farms obtained from existing sheds to start. At this point, a farm with one or more sheds may execute pre-training 404 using a pre-trained model 406 based on the library of collected data 402 from other sheds from a particular farm or from one or more farms. A new shed on a farm may begin transfer learning 408 and collect data over a shorter period of time from the new shed. This may be known as calibration data 410. This may be used to generate an initial working model 412. The new shed may perform continuous learning 414 and continue to collect data from the new shed 416 and data from other existing sheds 418 that may be combined with the data from the new shed. The data collected over the longer period of time from the new shed and the data from the other existing sheds may be combined during the continuous learning to create the continuously refined model 420.

The training of the artificial intelligence model may be a repeating process. As an example, data may be collected on a first day and labeled. The data may then be used to train and refine the model. This may be repeated each day and it may be fully automated. In some examples, the training may run continuously, e.g., once a minute or at a particular interval of time. The training of the artificial intelligence model provides value in adapting for data and model drift. As an example, a farm may utilize a new breed of bird. The system may recognize the new breed and can train the artificial intelligence model in a short period of time.

As another example, the training of the artificial intelligence model may be related to one or more of processing of full shed images (stitched), full mortality detection and analysis, remote farmer access, cluster analysis and alert, footfall analysis (full shed), thermometric sensor analysis, thermal imaging for health, produce sounds for welfare, activity index, ammonia sensing, illness or maim detection by behavior, full individual chicken tracking for research (full shed), directed rover for activity and inspection, pan-tilt-zoom (PTZ) close up view, free-range visual inspection, weighing by sound, directed light to cause activity, visual weighing, drinker/feeder height corrections, podo/hock sickness detection with close view, human in shed detection, litter quality monitoring, shed clean-out detection, chicken count estimate, sound monitoring full shed, robot for inspection and activity, visual inspection at nighttime (including catching), e-nose/smells, recommendation engine, welfare index, anomaly detection, gait scoring, audit support, silo management, activity share analysis, warped view deep dive, pan-tilt-zoom (PTZ) for manual control, extra IR illumination, mobile access, pan-tilt-zoom (PTZ) close inspection by anomaly detection, macro movement analysis, pose estimation, beacon sensors, farm management tools, deviation from normal indexes as sickness indicator, toys analysis for research, colorization of night vision, outside weather monitoring and alerts, check focused analysis, collecting sound for welfare, flu detection, rover for collection of eggs/dead birds, dominant chicken and cockerels detection, feeding analysis segmentation, feather coverage and feather cleanliness, consumer provenance MotherHen, close view for utilization, research antibiotics, sleep disturbance, light intensity for research or health, management scoring system, outdoor counting, light maps, measuring damaging behaviors, and feeder/drinker popularity analysis, among others.

Figure 5:
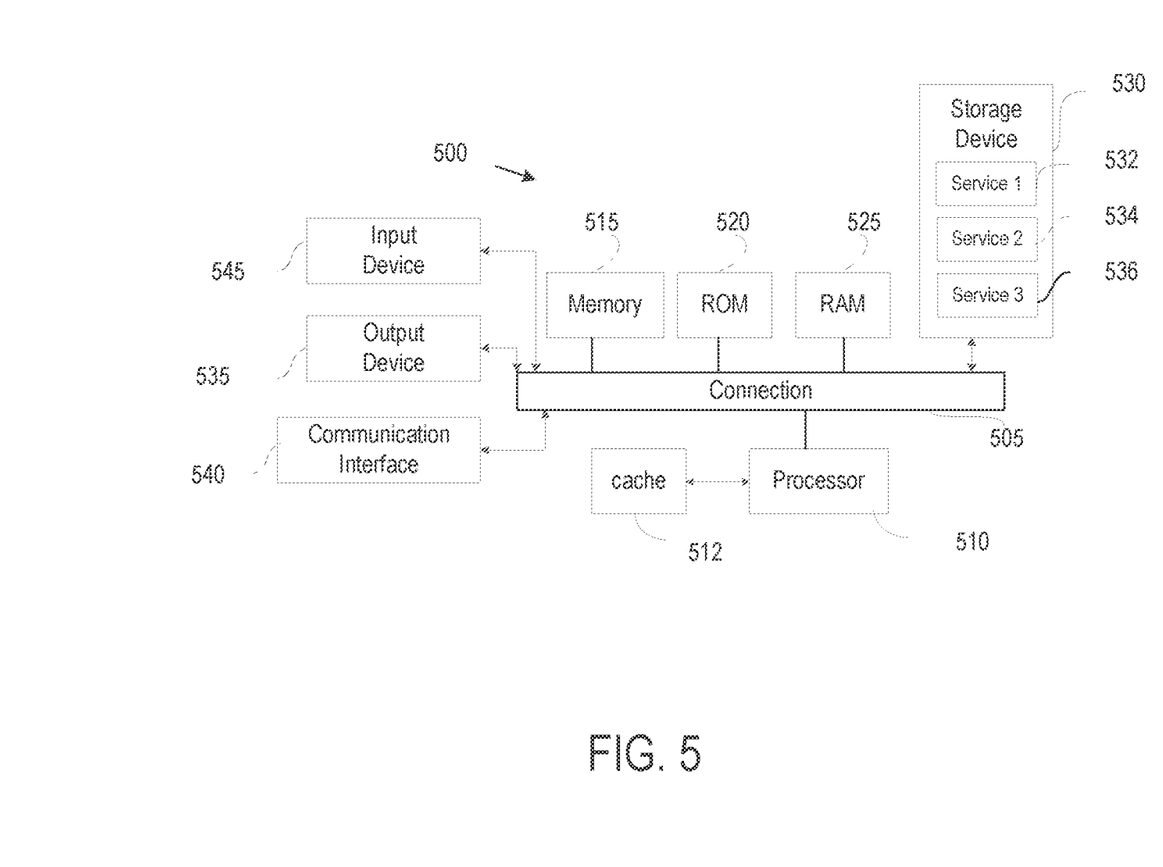
FIG. 5 shows an example of a system for implementing certain aspects of the present technology.

FIG. 5 shows an example of computing system 500, which can be for example any computing device making up the at least one server computing device 102, the at least one shed computing device 104, the at least one client computing device 106, and the at least one imaging device 108, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A method comprising: training, by at least one processor, an artificial intelligence model using a library of data associated with poultry, receiving, by the at least one processor, realtime information associated with a plurality of poultry from at least one imaging device at a particular location, determining at least one benchmark based on the realtime information associated with the plurality of poultry from the at least one imaging device and using the artificial intelligence model, and generating and sending an alert in realtime to a client computing device based on the realtime information associated with the plurality of poultry.

Aspect 2: The method of Aspect 1, further comprising transmitting the realtime information associated with the plurality of poultry from the at least one imaging device to at least one server computing device for processing by the at least one server computing device and transmitting the processed realtime information from the at least one server computing device to a client computing device for display on a display of the client computing device.

Aspect 3: The method of Aspects 1 and 2, further comprising generating de-identification data based on the realtime information associated with the plurality of poultry from the at least one imaging device.

Aspect 4: The method of any of Aspects 1 to 3, wherein the plurality of poultry comprise at least one of a chicken, a turkey, a duck, and a goose.

Aspect 5: The method of any of Aspects 1 to 4, wherein the plurality of poultry are physically located in a first enclosure at the particular location.

Aspect 6: The method of any of Aspects 1 to 5, wherein the plurality of poultry are physically located in at least one enclosure at the particular location.

Aspect 7: The method of any of Aspects 1 to 6, wherein the at least one benchmark comprises one or more of activity monitoring, spread index, weight information associated with the plurality of poultry, human activity at the particular location, mortality information associated with the plurality of poultry, and ammonia information at the particular location.

Aspect 8: The method of any of Aspects 1 to 7, further comprising generating a poultry welfare index based on the at least one benchmark using the artificial intelligence model.

Aspect 9: The method of any of Aspects 1 to 8, further comprising adding the realtime information to the library of data and retraining the intelligence model using the realtime information.

Aspect 10: The method of any of Aspects 1 to 9, further comprising generating compressed imaging data by dynamically compressing the realtime information from the at least one imaging device and transmitting the compressed imaging data to a client computing device.

Aspect 11: The method of any of Aspects 1 to 10, further comprising storing information associated with the plurality of poultry using at least one blockchain.

Aspect 12: The method of any of Aspects 1 to 11, further comprising anonymizing the realtime information associated with the plurality of poultry and transmitting the realtime information to a server computing device for storage in a database.

Aspect 13: The method of any of Aspects 1 to 12, further comprising obtaining the library of data associated with the poultry, the library of data associated with a particular period of time, labeling the library of data associated with the particular period of time, and training the artificial intelligence model.

Aspect 14: The method of any of Aspects 1 to 13, retraining the artificial intelligence model each day.

Aspect 15: The method of any of Aspects 1 to 14, retraining the artificial intelligence model every minute.

Aspect 16: The method of any of Aspects 1 to 15, wherein the artificial intelligence model automatically retrains continuously.

Aspect 17: The method of any of Aspects 1 to 16, wherein the plurality of poultry are associated with at least one supplier or company.

Aspect 18: The method of any of Aspects 1 to 17, further comprising determining a benchmark associated with the plurality of poultry associated with the at least one supplier or company.

Aspect 19: The method of any of Aspects 1 to 18, further comprising transmitting an alert associated with a particular supplier or company when the benchmark is less than a particular threshold or above the particular threshold.

Aspect 20: A system including at least one processor of a computing device to train an artificial intelligence model using a library of data associated with poultry, receive realtime information associated with a plurality of poultry from at least one imaging device at a particular location, determine at least one benchmark based on the realtime information associated with the plurality of poultry from the at least one imaging device and using the artificial intelligence model, and generate and send an alert in realtime to a client computing device based on the realtime information associated with the plurality of poultry.

Aspect 21: The system of Aspect 20, the at least one processor further to anonymize the realtime information associated with the plurality of poultry and transmit the realtime information to a server computing device for storage in a database.

Aspect 22: A non-transitory computer-readable storage medium, having instructions stored thereon that, when executed by at least one computing device cause the at least one computing device to perform operations, the operations comprising: training an artificial intelligence model using a library of data associated with poultry, receiving realtime information associated with a plurality of poultry from at least one imaging device at a particular location, determining at least one benchmark based on the realtime information associated with the plurality of poultry from the at least one imaging device and using the artificial intelligence model, and generating and sending an alert in realtime to a client computing device based on the realtime information associated with the plurality of poultry.

Aspect 23: The non-transitory computer-readable storage medium of Aspect 22, the operations further including anonymizing the realtime information associated with the plurality of poultry transmitting the realtime information to a server computing device for storage in a database.

What is claimed is:

1. A method comprising:
    training, by at least one processor, an artificial intelligence model using a library of data associated with poultry, the artificial intelligence model trained based on pre-trained data from other farms before a first time and after the first time training the artificial intelligence model using the pre-trained data from other farms as a first percentage that decreases and using data from a particular location that increases as a second percentage greater than the first percentage over time as data from the particular location increases;
    receiving, by the at least one processor, realtime information associated with a plurality of poultry from at least one imaging device at the particular location;
    determining, by the at least one processor, at least one benchmark based on the realtime information associated with the plurality of poultry from the at least one imaging device and using the artificial intelligence model by performing higher-bandwidth computing tasks associated with the model by at least one shed computing device and performing lower-bandwidth computing tasks associated with the model by at least one server computing device;
    adding, by the at least one processor, the realtime information to the library of data and retraining the artificial intelligence model using the realtime information; and
    generating and sending, by the at least one processor, an alert in realtime to a client computing device based on the realtime information associated with the plurality of poultry.

2. The method of claim 1, further comprising transmitting the realtime information associated with the plurality of poultry from the at least one imaging device to at least one server computing device for processing by the at least one server computing device and transmitting the processed realtime information from the at least one server computing device to a client computing device for display on a display of the client computing device.

3. The method of claim 1, further comprising generating de-identification data based on the realtime information associated with the plurality of poultry from the at least one imaging device.

4. The method of claim 1, wherein the plurality of poultry comprise at least one of a chicken, a turkey, a duck, and a goose.

5. The method of claim 1, wherein the plurality of poultry are physically located in a first enclosure at the particular location.

6. The method of claim 1, wherein the plurality of poultry are physically located in at least one enclosure at the particular location.

7. The method of claim 1, wherein the at least one benchmark comprises one or more of activity monitoring, spread index, weight information associated with the plurality of poultry, human activity at the particular location, mortality information associated with the plurality of poultry, and ammonia information at the particular location.

8. The method of claim 1, further comprising generating a poultry welfare index based on the at least one benchmark using the artificial intelligence model.

9. The method of claim 1, further comprising generating compressed imaging data by dynamically compressing the realtime information from the at least one imaging device and transmitting the compressed imaging data to a client computing device.

10. The method of claim 1, further comprising storing information associated with the plurality of poultry using at least one blockchain.

11. The method of claim 1, further comprising anonymizing the realtime information associated with the plurality of poultry and transmitting the realtime information to a server computing device for storage in a database.

12. The method of claim 1, further comprising obtaining the library of data associated with the poultry, the library of data associated with a particular period of time, labeling the library of data associated with the particular period of time, and training the artificial intelligence model.

13. The method of claim 12, further comprising retraining the artificial intelligence model each day.

14. The method of claim 12, further comprising retraining the artificial intelligence model every minute.

15. The method of claim 12, wherein the artificial intelligence model automatically retrains continuously.

16. The method of claim 1, wherein the plurality of poultry are associated with at least one supplier or company.

17. The method of claim 16, further comprising determining a benchmark associated with the plurality of poultry associated with the at least one supplier or company.

18. The method of claim 17, further comprising transmitting an alert associated with a particular supplier or company when the benchmark is less than a particular threshold or above the particular threshold.

19. A system comprising:
at least one processor of a computing device to:
train an artificial intelligence model using a library of data associated with poultry, the artificial intelligence model trained based on pre-trained data from other farms before a first time and after the first time train the artificial intelligence model using the pre-trained data from other farms as a first percentage that decreases and using data from a particular location that increases as a second percentage greater than the first percentage over time as data from the particular location increases;
receive realtime information associated with a plurality of poultry from at least one imaging device at the particular location;
determine at least one benchmark based on the realtime information associated with the plurality of poultry from the at least one imaging device and using the artificial intelligence model by performing higher-bandwidth computing tasks associated with the model by at least one shed computing device and performing lower-bandwidth computing tasks associated with the model by at least one server computing device;
add the realtime information to the library of data and retrain the artificial intelligence model using the realtime information; and
generate and send an alert in realtime to a client computing device based on the realtime information associated with the plurality of poultry.

20. The system of claim 19, the at least one processor further to anonymize the realtime information associated with the plurality of poultry and transmit the realtime information to a server computing device for storage in a database.

21. A non-transitory computer-readable storage medium, having instructions stored thereon that, when executed by at least one computing device cause the at least one computing device to perform operations, the operations comprising:
training an artificial intelligence model using a library of data associated with poultry, the artificial intelligence model trained based on pre-trained data from other farms before a first time and after the first time training the artificial intelligence model using the pre-trained data from other farms as a first percentage that decreases and using data from a particular location that increases as a second percentage greater than the first percentage over time as data from the particular location increases;
receiving realtime information associated with a plurality of poultry from at least one imaging device at the particular location;
determining at least one benchmark based on the realtime information associated with the plurality of poultry from the at least one imaging device and using the artificial intelligence model by performing higher-bandwidth computing tasks associated with the model by at least one shed computing device and performing lower-bandwidth computing tasks associated with the model by at least one server computing device;
adding the realtime information to the library of data and retraining the artificial intelligence model using the realtime information; and
generating and sending an alert in realtime to a client computing device based on the realtime information associated with the plurality of poultry.

22. The non-transitory computer-readable storage medium of claim 21, the operations further comprising anonymizing the realtime information associated with the plurality of poultry and transmitting the realtime information to a server computing device for storage in a database.

* * * * *